(12) United States Patent
Zhao et al.

(10) Patent No.: US 9,591,541 B2
(45) Date of Patent: Mar. 7, 2017

(54) MIGRATION METHOD AND APPARATUS

(71) Applicant: Huawei Technologies Co., Ltd., Shenzhen, Guangdong (CN)

(72) Inventors: Junhui Zhao, Shenzhen (CN); Hongping Zhang, Shanghai (CN); Qinghai Zeng, Shanghai (CN); Tao Zhong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 57 days.

(21) Appl. No.: 14/723,255

(22) Filed: May 27, 2015

(65) Prior Publication Data

US 2015/0257070 A1    Sep. 10, 2015

Related U.S. Application Data

(63) Continuation of application No. PCT/CN2012/085672, filed on Nov. 30, 2012.

(51) Int. Cl.
*H04W 36/22* (2009.01)
*H04W 36/00* (2009.01)
*H04W 36/14* (2009.01)

(52) U.S. Cl.
CPC ........ *H04W 36/22* (2013.01); *H04W 36/0066* (2013.01); *H04W 36/14* (2013.01)

(58) Field of Classification Search
CPC .. H04W 36/22; H04W 36/0066; H04W 36/14
See application file for complete search history.

(56) References Cited

U.S. PATENT DOCUMENTS

2006/0025135 A1*  2/2006  Karaoguz ......... H04L 29/06027
                                                        455/436
2006/0251104 A1   11/2006  Koga
2007/0026866 A1   2/2007  Krishnamurthi et al.
(Continued)

FOREIGN PATENT DOCUMENTS

CN        101505510 A     8/2009
CN        101772106 A     7/2010
(Continued)

OTHER PUBLICATIONS

Wei Song, et al., "Load Balancing for Cellular/WLAN Integrated Networks", IEEE Network, vol. 21, No. 1, Jan. 1, 2007, p. 27-33.
(Continued)

*Primary Examiner* — Brian D Nguyen

(57) ABSTRACT

The present invention discloses a migration method and an apparatus, which relate to the field of communications technologies and are invented for implementation of proper configuration of different network resources. The method includes: sending, by a base station of a first network, information to a user equipment, where the information is used for: migrating, by the user equipment, from a second network to the first network, where the user equipment is in an idle state relative to the first network; or determining, by the user equipment, whether to migrate from the first network to the second network, where the first network is a 3GPP network, and the second network is a non-3GPP network. The present invention is mainly applied to a process of network migration of the user equipment.

8 Claims, 3 Drawing Sheets

(56) References Cited

U.S. PATENT DOCUMENTS

| | | |
|---|---|---|
| 2007/0224988 A1 | 9/2007 | Shaheen |
| 2008/0095138 A1* | 4/2008 | Wu .................. H04L 29/12301 370/342 |
| 2008/0102843 A1* | 5/2008 | Todd ..................... H04W 36/18 455/445 |
| 2009/0017826 A1* | 1/2009 | Shaheen ........... H04W 36/0016 455/442 |
| 2010/0159934 A1 | 6/2010 | Forssell |
| 2010/0291863 A1 | 11/2010 | Hsu et al. |
| 2011/0294539 A1* | 12/2011 | Shin ...................... H04W 48/18 455/552.1 |
| 2012/0269167 A1* | 10/2012 | Velev ................ H04W 36/0011 370/331 |
| 2013/0324168 A1 | 12/2013 | Ishii et al. |
| 2014/0003254 A1* | 1/2014 | Andreoli-Fang ..... H04W 48/12 370/252 |

FOREIGN PATENT DOCUMENTS

| | | |
|---|---|---|
| CN | 102223677 A | 10/2011 |
| EP | 1 898 564 A1 | 3/2008 |
| JP | 2006-287426 A | 10/2006 |
| JP | 2012-231334 A | 11/2012 |
| RU | 2395912 C2 | 7/2010 |

OTHER PUBLICATIONS

"Interaction of ANDSF with enhanced policy framework", Panasonic, NEC, 3GPP TSG SA WG2 Meeting #81, Oct. 11-15, 2010, 2 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.3.0, Sep. 2012, 205 pages.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.1.0, Sep. 2012, 325 pages.

"3rd Generation Partnership Project; Technical Specification Group Radio Access Network; Evolved Universal Terrestrial Radio Access (E-UTRA); User Equipment (UE) procedures in idle mode (Release 11)", 3GPP TS 36.304 V11.1.0, Sep. 2012, 33 pages.

* cited by examiner

MIGRATION METHOD AND APPARATUS

CROSS-REFERENCE TO RELATED APPLICATIONS

This application is a continuation of International Application No. PCT/CN2012/085672, filed on Nov. 30, 2012, which is hereby incorporated by reference in its entirety.

TECHNICAL FIELD

The present invention relates to the field of mobile communications technologies, and in particular, to a migration method and an apparatus.

BACKGROUND

To strengthen competitiveness of a future mobile network, the 3rd Generation Partnership Project (3GPP, The 3rd Generation Partnership Project) focuses on system architecture evolution (SAE, System Architecture Evolution) of multi-network convergence in next-stage major development. A user may access an evolved packet core network (Evolved Packet Core) by using either a 3GPP access system or a non-3GPP (non 3GPP) access system. The 3GPP access system is a general packet radio service GPRS system, a Universal Mobile Telephone System UMTS, an evolved system architecture SAE, or the like. The non-3GPP access system is a wireless local area network WLAN, a Worldwide Interoperability for Microwave Access WiMAX network, a Code Division Multiple Access CDMA or CDMA2000 system, or the like.

For example, with development of a mobile communications system, a mobile communications technology provides an increasingly higher transmission rate and increasingly higher service network load quality. Wireless Fidelity (Wireless-Fidelity, WiFi for short) of a wireless local area network (Wireless Local Area Network, WLAN for short) is a type of wireless local area network that uses IEEE 802.11 family of standards. Because of a high transmission rate and convenient network deployment, Wireless Fidelity currently has become one of the most widely used WLANs. A user equipment (User Equipment, UE for short), such as a smartphone, may access a WLAN by using an access point (Access Point, AP) of the wireless local area network. In addition, the UE may also access the 3GPP by using a base station, for example, the UE accesses Long Term Evolution (Long Term Evolution, LTE) by using an evolved NodeB (evolved Node B, eNodeB for short). The development of mobile communications technologies enriches communication functions and capabilities of a UE and further popularizes the UE. However, popularization of the UE causes increasing load pressure of a WLAN, which results in a problem that due to capacity saturation, the WLAN cannot support normal communication of the UE.

Currently, there is a lack of an effective mechanism that ensures proper migration of a UE between WiFi and LTE to support normal communication of the UE.

SUMMARY

The present invention provides a migration method and an apparatus, so as to resolve a problem of UE migration between a 3GPP network and a non-3GPP network.

According to a first aspect, the present invention provides a migration method, including:

sending, by a base station of a first network, information to a user equipment, where the information is used for:
migrating, by the user equipment, from a second network to the first network, where the user equipment is in an idle state relative to the first network; or
determining, by the user equipment, whether to migrate from the first network to the second network, where the first network is a 3GPP network, and the second network is a non-3GPP network.

In a first possible implementation manner of the first aspect, that the information is used for migrating, by the user equipment, from a second network to the first network specifically includes that:
the information is indication information used for instructing the user equipment to stop service transmission to the second network, or for instructing the user equipment to migrate the service transmission to the first network.

With reference to the first aspect or the first possible implementation manner of the first aspect, a second possible implementation manner of the first aspect is further provided, and in the second possible implementation manner of the first aspect, that the information is used for migrating, by the user equipment, from a second network to the first network specifically includes that:
the information includes information about an access point of the second network, and is used by the user equipment, according to the information about the access point, for:
stopping service transmission to the access point, or migrating the service transmission to the first network.

With reference to the first aspect or the first or second possible implementation manner of the first aspect, a third possible implementation manner of the first aspect is further provided, and in the third possible implementation manner of the first aspect, that the information is used for migrating, by the user equipment, from a second network to the first network specifically includes that:
the information includes a probability value, and is used by the user equipment, according to the probability value and a random number run by the user equipment, for:
stopping service transmission to the second network, or migrating the service transmission to the first network.

With reference to the first aspect or the first, second, or third possible implementation manner of the first aspect, a fourth possible implementation manner of the first aspect is further provided, and in the fourth possible implementation manner of the first aspect, that the information is used for migrating, by the user equipment, from a second network to the first network specifically includes that:
the information includes an identifier of the user equipment, and is used by the user equipment, according to the identifier, for:
stopping service transmission to the second network, or migrating the service transmission to the first network.

With reference to the first aspect or the first, second, third, or fourth possible implementation manner of the first aspect, a fifth possible implementation manner of the first aspect is further provided, and in the fifth possible implementation manner of the first aspect, the method further includes:
receiving, by the base station, a Media Access Control address that is of the user equipment and sent by the access point of the second network; and
acquiring, by the base station, the identifier of the user equipment according to the Media Access Control address of the user equipment.

With reference to the first aspect or the first, second, third, fourth, or fifth possible implementation manner of the first aspect, a sixth possible implementation manner of the first aspect is further provided, and in the sixth possible implementation manner of the first aspect, the method further includes:

acquiring, by the base station, load information of the access point; or acquiring, by the base station, a service type of the user equipment; or acquiring, by the base station, preference information of the user equipment, where the preference information includes an identifier of a first choice network to be accessed by the user equipment when both the first network and the second network can support normal communication of the user equipment.

With reference to the first aspect or the first, second, third, fourth, fifth, or sixth possible implementation manner of the first aspect, a seventh possible implementation manner of the first aspect is further provided, and in the seventh possible implementation manner of the first aspect, that the information is used for determining, by the user equipment, whether to migrate from the first network to the second network specifically includes that:

the information includes access information of an access point, and is used by the user equipment for determining, according to the access information, whether to migrate from the first network to the second network, where the access information is at least one of the following:

load information of the access point; and information about whether the user equipment is allowed to access the access point.

With reference to the first aspect or the first, second, third, fourth, fifth, sixth, or seventh possible implementation manner of the first aspect, an eighth possible implementation manner of the first aspect is further provided, and in the eighth possible implementation manner of the first aspect, the sending, by a base station of a first network, information to a user equipment specifically includes:

sending, by the base station, the information to the user equipment by using any type of the following message:

a system message;

a paging message; or a dedicated message.

According to a second aspect, the present invention further provides a migration method, including:

receiving, by a user equipment, information sent by a base station of a first network; and according to the information, migrating, by the user equipment, from a second network to the first network, where the user equipment is in an idle state relative to the first network; or determining, by the user equipment, whether to migrate from the first network to the second network, where the first network is a 3GPP network, and the second network is a non-3GPP network.

In a first possible implementation manner of the second aspect, the receiving, by a user equipment, information sent by a base station of a first network specifically includes:

receiving, by the user equipment, indication information sent by the base station; and the migrating, by the user equipment, from a second network to the first network according to the information specifically includes:

according to the indication information, stopping, by the user equipment, service transmission to the second network, or migrating the service transmission to the first network.

With reference to the second aspect or the first possible implementation manner of the second aspect, a second possible implementation manner of the second aspect is further provided, and in the second possible implementation manner of the second aspect, the receiving, by a user equipment, information sent by the base station specifically includes:

receiving, by the user equipment, information that is about an access point of the second network and sent by the base station; and the migrating, by the user equipment, from a second network to the first network according to the information specifically includes:

according to the information about the access point, stopping, by the user equipment, service transmission to the access point, or migrating the service transmission to the first network.

With reference to the second aspect or the first or second possible implementation manner of the second aspect, a third possible implementation manner of the second aspect is further provided, and in the third possible implementation manner of the second aspect, the receiving, by a user equipment, information sent by the base station specifically includes:

receiving, by the user equipment, a probability value sent by the base station; and the migrating, by the user equipment, from a second network to the first network according to the information specifically includes:

according to the probability value and a random number run by the user equipment, stopping, by the user equipment, service transmission to the second network, or migrating the service transmission to the first network.

With reference to the second aspect or the first, second, or third possible implementation manner of the second aspect, a fourth possible implementation manner of the second aspect is further provided, and in the fourth possible implementation manner of the second aspect, the receiving, by a user equipment, information sent by the base station specifically includes:

receiving, by the user equipment, an identifier that is of the user equipment and sent by the base station; and the migrating, by the user equipment, from a second network to the first network according to the information specifically includes:

according to the identifier, stopping, by the user equipment, service transmission to the second network, or migrating the service transmission to the first network.

With reference to the second aspect or the first, second, third, or fourth possible implementation manner of the second aspect, a fifth possible implementation manner of the second aspect is further provided, and in the fifth possible implementation manner of the second aspect, the receiving, by a user equipment, information sent by the base station specifically includes:

receiving, by the user equipment, access information sent by the base station, where the access information is at least one of the following:

load information of an access point; and information about whether the user equipment is allowed to access the access point; and the determining, by the user equipment according to the information, whether to migrate from the first network to the second network specifically includes:

determining, by the user equipment according to the access information, whether to migrate from the first network to the second network.

According to a third aspect, the present invention further provides a base station, where the base station is located in a first network, and the base station includes:

a sending unit, configured to send information to a user equipment, where the information is used for:

migrating, by the user equipment, from a second network to the first network, where the user equipment is in an idle state relative to the first network; or determining, by the user equipment, whether to migrate from the first network to the second network, where the first network is a 3GPP network, and the second network is a non-3GPP network.

In a first possible implementation manner of the third aspect, the sending unit is specifically configured to:

send, to the user equipment, indication information used for instructing the user equipment to stop service transmission to the second network, or for instructing the user equipment to migrate the service transmission to the first network.

With reference to the third aspect or the first possible implementation manner of the third aspect, a second possible implementation manner of the third aspect is further provided, and in the second possible implementation manner of the third aspect, the sending unit is specifically configured to:

send, to the user equipment, information about an access point of the second network, which is used by the user equipment, according to the information about the access point, for:

stopping service transmission to the access point, or migrating the service transmission to the first network.

With reference to the third aspect or the first or second possible implementation manner of the third aspect, a third possible implementation manner of the third aspect is further provided, and in the third possible implementation manner of the third aspect, the sending unit is specifically configured to:

send the user equipment a probability value, which is used by the user equipment, according to the probability value and a random number run by the user equipment, for:

stopping service transmission to the second network, or migrating the service transmission to the first network.

With reference to the third aspect or the first, second, or third possible implementation manner of the third aspect, a fourth possible implementation manner of the third aspect is further provided, and in the fourth possible implementation manner of the third aspect, the sending unit is specifically configured to:

send the user equipment an identifier of the user equipment, which is used by the user equipment, according to the identifier, for:

stopping service transmission to the second network, or migrating the service transmission to the first network.

With reference to the third aspect or the first, second, third, or fourth possible implementation manner of the third aspect, a fifth possible implementation manner of the third aspect is further provided, and in the fifth possible implementation manner of the third aspect, the base station further includes:

a receiving unit, configured to receive a Media Access Control address that is of the user equipment and sent by the access point of the second network; and a processing unit, configured to acquire the identifier of the user equipment according to the Media Access Control address of the user equipment.

With reference to the third aspect or the first, second, third, fourth, or fifth possible implementation manner of the third aspect, a sixth possible implementation manner of the third aspect is further provided, and in the sixth possible implementation manner of the third aspect, the base station further includes:

an acquiring unit, configured to acquire:

load information of the access point; or a service type of the user equipment; or preference information of the user equipment, where the preference information includes an identifier of a first choice network to be accessed by the user equipment when both the first network and the second network can support normal communication of the user equipment.

With reference to the third aspect or the first, second, third, fourth, fifth, or sixth possible implementation manner of the third aspect, a seventh possible implementation manner of the third aspect is further provided, and in the seventh possible implementation manner of the third aspect, the sending unit is specifically configured to:

send access information of an access point to the user equipment, so that the user equipment determines, according to the access information, whether to migrate from the first network to the second network, where the access information is at least one of the following:

load information of the access point; and information about whether the user equipment is allowed to access the access point.

With reference to the third aspect or the first, second, third, fourth, fifth, sixth, or seventh possible implementation manner of the third aspect, an eighth possible implementation manner of the third aspect is further provided, and in the eighth possible implementation manner of the third aspect, the sending unit is specifically configured to:

send the information to the user equipment by using any type of the following message:

a system message;

a paging message; or a dedicated message.

According to a fourth aspect, the present invention further provides a user equipment, including:

a receiving unit, configured to receive information sent by a base station of a first network; and a processing unit, configured to, according to the information received by the receiving unit, migrate from a second network to the first network, where the user equipment is in an idle state relative to the first network; or determine whether to migrate from the first network to the second network, where the first network is a 3GPP network, and the second network is a non-3GPP network.

In a first possible implementation manner of the fourth aspect, the receiving unit is specifically configured to receive indication information sent by the base station; and the processing unit is specifically configured to, according to the indication information, stop service transmission to the second network, or migrate the service transmission to the first network.

With reference to the fourth aspect or the first possible implementation manner of the fourth aspect, a second possible implementation manner of the fourth aspect is further provided, and in the second possible implementation manner of the fourth aspect, the receiving unit is specifically configured to receive information that is about an access point of the second network and sent by the base station; and the processing unit is specifically configured to, according to the information about the access point, stop service transmission to the access point, or migrate the service transmission to the first network.

With reference to the fourth aspect or the first or second possible implementation manner of the fourth aspect, a third possible implementation manner of the fourth aspect is further provided, and in the third possible implementation manner of the fourth aspect, the receiving unit is specifically configured to receive a probability value sent by the base station; and the processing unit is specifically configured to, according to the probability value and a random number run by the user equipment, stop service transmission to the second network, or migrate the service transmission to the first network.

With reference to the fourth aspect or the first, second, or third possible implementation manner of the fourth aspect, a fourth possible implementation manner of the fourth aspect is further provided, and in the fourth possible implementation manner of the fourth aspect, the receiving unit is specifically configured to receive an identifier that is of the user equipment and sent by the base station; and the processing unit is specifically configured to, according to the identifier, stop service transmission to the second network, or migrate the service transmission to the first network.

With reference to the fourth aspect or the first, second, third, or fourth possible implementation manner of the fourth aspect, a fifth possible implementation manner of the fourth aspect is further provided, and in the fifth possible implementation manner of the fourth aspect, the receiving unit is specifically configured to receive access information sent by the base station, where the access information is at least one of the following:

load information of an access point; and information about whether the user equipment is allowed to access the access point; and the processing unit is specifically configured to determine, according to the access information, whether to migrate from the first network to the second network.

According to a fifth aspect, the present invention further provides a base station, where the base station is located in a first network, and the base station includes:

a transmitter, configured to send information to a user equipment, where the information is used for:

migrating, by the user equipment, from a second network to the first network, where the user equipment is in an idle state relative to the first network; or determining, by the user equipment, whether to migrate from the first network to the second network, where the first network is a 3GPP network, and the second network is a non-3GPP network.

In a first possible implementation manner of the fifth aspect, the transmitter is specifically configured to:

send, to the user equipment, indication information used for instructing the user equipment to stop service transmission to the second network, or for instructing the user equipment to migrate the service transmission to the first network.

With reference to the fifth aspect or the first possible implementation manner of the fifth aspect, a second possible implementation manner of the fifth aspect is further provided, and in the second possible implementation manner of the fifth aspect, the transmitter is specifically configured to:

send, to the user equipment, information about an access point of the second network, which is used by the user equipment, according to the information about the access point, for:

stopping service transmission to the access point, or migrating the service transmission to the first network.

With reference to the fifth aspect or the first or second possible implementation manner of the fifth aspect, a third possible implementation manner of the fifth aspect is further provided, and in the third possible implementation manner of the fifth aspect, the transmitter is specifically configured to:

send the user equipment a probability value, which is used by the user equipment, according to the probability value and a random number run by the user equipment, for:

stopping service transmission to the second network, or migrating the service transmission to the first network.

With reference to the fifth aspect or the first, second, or third possible implementation manner of the fifth aspect, a fourth possible implementation manner of the fifth aspect is further provided, and in the fourth possible implementation manner of the fifth aspect, the transmitter is specifically configured to:

send the user equipment an identifier of the user equipment, which is used by the user equipment, according to the identifier, for:

stopping service transmission to the second network, or migrating the service transmission to the first network.

With reference to the fifth aspect or the first, second, third, or fourth possible implementation manner of the fifth aspect, a fifth possible implementation manner of the fifth aspect is further provided, and in the fifth possible implementation manner of the fifth aspect, the base station further includes:

a receiver, configured to receive a Media Access Control address that is of the user equipment and sent by the access point of the second network, and acquire the identifier of the user equipment according to the Media Access Control address of the user equipment.

With reference to the fifth aspect or the first, second, third, fourth, or fifth possible implementation manner of the fifth aspect, a sixth possible implementation manner of the fifth aspect is further provided, and in the sixth possible implementation manner of the fifth aspect, the receiver is further configured to receive:

load information of the access point;

a service type of the user equipment; or preference information of the user equipment, where the preference information includes an identifier of a first choice network to be accessed by the user equipment when both the first network and the second network can support normal communication of the user equipment.

With reference to the fifth aspect or the first, second, third, fourth, fifth, or sixth possible implementation manner of the fifth aspect, a seventh possible implementation manner of the fifth aspect is further provided, and in the seventh possible implementation manner of the fifth aspect, the transmitter is specifically configured to:

send access information of an access point to the user equipment, so that the user equipment determines, according to the access information, whether to migrate from the first network to the second network, where the access information is at least one of the following:

load information of the access point; and information about whether the user equipment is allowed to access the access point.

With reference to the fifth aspect or the first, second, third, fourth, fifth, sixth, or seventh possible implementation manner of the fifth aspect, an eighth possible implementation manner of the fifth aspect is further provided, and in the eighth possible implementation manner of the fifth aspect, the transmitter is specifically configured to send the information to the user equipment by using any type of the following message:
- a system message;
- a paging message; or
- a dedicated message.

According to a sixth aspect, the present invention further provides a user equipment, including:
a receiver, configured to receive information sent by a base station of a first network; and
a processor, configured to, according to the information received by the receiver,
migrate from a second network to the first network, where the user equipment is in an idle state relative to the first network; or
determine whether to migrate from the first network to the second network, where
the first network is a 3GPP network, and the second network is a non-3GPP network.

In a first possible implementation manner of the sixth aspect, the receiver is specifically configured to receive indication information sent by the base station; and
the processor is specifically configured to, according to the indication information, stop service transmission to the second network, or migrate the service transmission to the first network.

With reference to the sixth aspect or the first possible implementation manner of the sixth aspect, a second possible implementation manner of the sixth aspect is further provided, and in the second possible implementation manner of the sixth aspect, the receiver is specifically configured to receive information about an access point of the second network and sent by the base station; and
the processor is specifically configured to, according to the information about the access point, stop service transmission to the access point, or migrate the service transmission to the first network.

With reference to the sixth aspect or the first or second possible implementation manner of the sixth aspect, a third possible implementation manner of the sixth aspect is further provided, and in the third possible implementation manner of the sixth aspect, the receiver is specifically configured to receive a probability value sent by the base station; and
the processor is specifically configured to, according to the probability value and a random number run by the user equipment, stop service transmission to the second network, or migrate the service transmission to the first network.

With reference to the sixth aspect or the first, second, or third possible implementation manner of the sixth aspect, a fourth possible implementation manner of the sixth aspect is further provided, and in the fourth possible implementation manner of the sixth aspect, the receiver is specifically configured to receive an identifier that is of the user equipment and sent by the base station; and
the processor is specifically configured to, according to the identifier, stop service transmission to the second network, or migrate the service transmission to the first network.

With reference to the sixth aspect or the first, second, third, or fourth possible implementation manner of the sixth aspect, a fifth possible implementation manner of the sixth aspect is further provided, and in the fifth possible implementation manner of the sixth aspect, the receiver is specifically configured to receive access information sent by the base station, where the access information is at least one of the following:
load information of an access point; and
information about whether the user equipment is allowed to access the access point; and
the processor is specifically configured to determine, according to the access information, whether to migrate from the first network to the second network.

According to a migration method and an apparatus that are provided in the present invention, a base station sends information to a user equipment; and the user equipment in an idle state relative to a first network migrates from a second network to the first network according to the information; or the user equipment in a non-idle state relative to the first network determines, according to the information, whether to migrate from the first network to the second network, thereby ensuring proper migration of a UE between WiFi and LTE to support normal communication of the UE.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

This specification describes various aspects with reference to a terminal and/or a base station.

The terminal refers to a device providing voice and/or data connectivity for a user, and may be a wireless terminal or a wired terminal. The wireless terminal may be a handheld device having a radio connection function, or another processing device connected to a radio modem, or may be a mobile terminal that communicates with one or more core networks by using a radio access network. For example, the wireless terminal may be a mobile phone (also referred to as a "cellular" phone) and a computer with a mobile terminal. For another example, the wireless terminal may also be a portable, pocket-sized, handheld, computer built-in, or in-vehicle mobile apparatus. For still another example, the wireless terminal may be a mobile station (mobile station), an access point (access point), a user equipment (user equipment, UE for short), or the like.

The base station may refer to a device that communicates with the wireless terminal over an air interface in an access network by using one or more cells. For example, the base station may be a base station (base transceiver station, BTS for short) in the GSM or CDMA, or may be a NodeB (NodeB) in the WCDMA, or may be an evolved NodeB (evolved Node B, base station or e-NodeB for short) in the LTE, or a base station in an evolved network in the future, which is not limited in the present invention.

Figure 1:
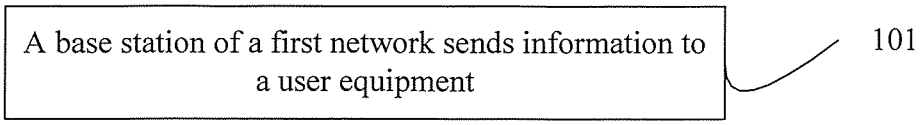
FIG. 1 is a flowchart of a migration method according to an embodiment of the present invention.

An embodiment of the present invention provides a migration method. As shown in FIG. 1, the method includes:

Step 101: A base station of a first network sends information to a user equipment.

The information is used for: migrating, by the user equipment, from a second network to the first network, where the user equipment is in an idle state relative to the first network; or determining, by the user equipment, whether to migrate from the first network to the second network, where the first network is a 3GPP network, and the second network is a non-3GPP network.

The information sent by the base station of the first network to the user equipment is used for two purposes: one is to instruct the user equipment to migrate from the second network to the first network, where the user equipment is in the idle state relative to the base station of the first network; the other is to instruct the user equipment not to migrate to the second network, where the user equipment is in a non-idle state relative to the base station of the first network. Migrating from the second network to the first network is specifically: stopping a service of the user equipment on the second network, or disconnecting, by the user equipment, its connection to the second network. Skipping migrating to the second network is specifically: disabling a receiver of the second network.

Optionally, that the information is used for migrating, by the user equipment, from a second network to the first network specifically includes that: the information is indication information used for instructing the user equipment to stop service transmission to the second network, or for instructing the user equipment to migrate the service transmission to the first network.

By sending the indication information to the user equipment, the base station may enable the user equipment that receives the indication information to stop the service transmission to the second network, or enable the user equipment to migrate the service transmission to the first network.

Optionally, that the information is used for migrating, by the user equipment, from a second network to the first network specifically includes that:

the information includes information about an access point of the second network, and is used by the user equipment, according to the information about the access point, for stopping service transmission to the access point, or migrating the service transmission to the first network.

The information about the access point is specifically an access point information list. For example, the access point information list includes a network identifier "wlan1". After the base station sends the access point information list to the user equipment, the user equipment that connects to a WLAN whose network identifier is "wlan1" stops the service transmission to the access point, or migrates the service transmission to the first network. In this manner, for a different second network, the base station may instruct the user equipment to stop the service transmission to the access point or migrate the service transmission to the first network.

Optionally, that the information is used for migrating, by the user equipment, from a second network to the first network specifically includes that:

the information includes a probability value, and is used by the user equipment, according to the probability value and a random number run by the user equipment, for stopping service transmission to the second network, or migrating the service transmission to the first network.

The probability value is a preset numerical value, such as a numerical value ranging from 0 to 1 (including 0 and 1) or from 1 to 100 (including 1 and 100). Because a random number is allocated randomly, there is a specific probability that the random number is less than the probability value. For example, when the probability value is 0.1, if the user equipment evenly runs a random number ranging from 0 to 1, a probability that an obtained random number is less than 0.1 is 10%. In this case, if the user equipment is in the idle state relative to the base station of the first network, that is, the user equipment connects to the second network, 10% of user equipments that connect to the second network stop the service transmission to the second network, or migrate the service transmission to the first network. In this manner, the base station may instruct a specific proportion of the user equipments that connect to the second network to stop the service transmission to the second network, or migrate the service transmission to the first network.

The base station may also send both the probability value and the information about the access point to the user equipment. If the information about the access point is "wlan2" and the probability value is "0.5", 50% of user equipments that connect to a second network whose network identifier is "wlan2" stop the service transmission to the second network, or migrate the service transmission to the first network.

Optionally, that the information is used for migrating, by the user equipment, from a second network to the first network specifically includes that:

the information includes an identifier of the user equipment, and is used by the user equipment, according to the identifier, for stopping service transmission to the second network, or migrating the service transmission to the first network.

The identifier of the user equipment is included in a user equipment identifier list. The base station sends the user equipment the user equipment identifier list, which is used by the user equipment, according to the user equipment identifier list, for stopping the service transmission to the second network, or migrating the service transmission to the first network.

To enable the base station to obtain the user equipment identifier list, the method further includes:

receiving, by the base station, a Media Access Control address that is of the user equipment and sent by the access point of the second network; and acquiring, by the base station, the identifier of the user equipment according to the Media Access Control address of the user equipment.

To enable the base station to obtain the user equipment identifier list of the user equipment, the method further includes: receiving, by the base station, an address list sent by the access point, where the address list includes the Media Access Control address of the user equipment; acquiring, by the base station, a user equipment identifier of the user equipment according to the Media Access Control address of the user equipment; and adding, by the base station, the acquired user equipment identifier to the user equipment identifier list.

The access point sends, to the base station, the address list that includes the Media Access Control address of the user equipment that connects to the second network. After receiving the address list from the access point, the base station queries, by using a controller, a core network for a system architecture elution temporary mobile subscriber identity (System Architecture Evolution Temporary Mobile Subscriber Identifier, S-TMSI for short) corresponding to the Media Access Control address in the address list. After receiving an S-TMSI that is of the user equipment and fed back by the core network, the base station maps the S-TMSI into a user equipment identifier and adds the user equipment identifier to the user equipment identifier list. In this manner, a user equipment identifier is converted from a Media Access Control address into an easy-to-identify equipment identifier by mapping, and readability of the user equipment identifier is improved.

In addition to a scenario in which the first network completely covers the second network, the foregoing process of acquiring an equipment identifier is further applied to a scenario in which the first network partially covers the second network, that is, a scenario in which the first network overlaps the second network. Descriptions of a user equipment by the base station of the first network and by the access point of the second network may be unified by using a Media Access Control address. When the first network overlaps the second network, that is, the user equipment may not locate within signal coverage of the base station of the first network or that of the access point of the second network, the information may be sent to the user equipment by using the base station of the first network or the access point of the second network according to the Media Access Control address.

Figure 2:
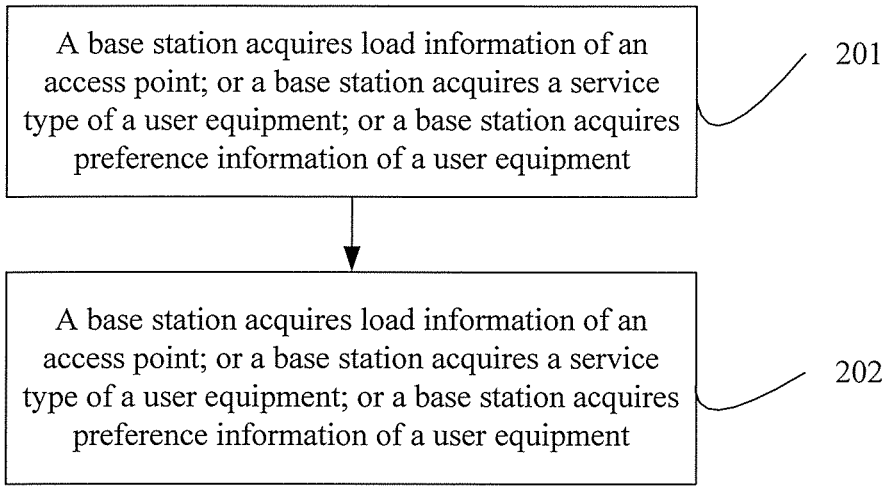
FIG. 2 is another flowchart of a migration method according to an embodiment of the present invention.

Further, as shown in FIG. 2, before step 101, the method further includes:

Step 201: The base station acquires load information of an access point; or the base station acquires a service type of the user equipment; or the base station acquires preference information (Preference Information) of the user equipment, where the preference information includes an identifier of a first choice network to be accessed by the user equipment when both the first network and the second network can support normal communication of the user equipment.

To enable the base station of the first network to obtain a network load status of the second network, the base station of the first network may acquire load information of the second network from the access point. The load information is used for representing a load status of the second network, for example, a load in the second network. If the load information is "100" and rated load information of the second network is "90", the base station instructs, according to the load information, the user equipment to stop the service transmission to the second network or migrate the service transmission to the first network.

The base station may further acquire, from the user equipment, a type of a service that the user equipment currently runs, and the base station instructs the user equipment according to the service type of the user equipment. For example, if the user equipment is in the idle state relative to the base station, and the service type acquired by the base station according to the user equipment is a voice call, it is determined that the voice call can be better performed if the user equipment connects to the first network, and the base station sends the user equipment the information, which is used for instructing the user equipment to stop the service transmission to the second network or migrate the service transmission to the first network.

The base station may further acquire the preference information from the user equipment, where the preference information includes the identifier of the first choice network to be accessed by the user equipment when both the first network and the second network can support normal communication of the user equipment. For example, if the preference information is "the first network" and the user equipment is in the idle state relative to the base station of the first network, the base station sends the user equipment the information, which is used for instructing the user equipment to stop the service transmission to the second network or migrate the service transmission to the first network.

Optionally, the information is used for determining, by the user equipment, whether to migrate from the first network to the second network specifically includes that: the information includes access information of an access point, and is used by the user equipment for determining, according to the access information, whether to migrate from the first network to the second network, where the access information is at least one of the following:

load information of the access point; and information about whether the user equipment is allowed to access the access point.

The load information includes an identifier of the second network, where the identifier of the second network is a network identifier of the second network that is overloaded. The base station instructs, according to an overload indication list of the second network, the user equipment that connects to the first network to disable the receiver of the second network, that is, instructs the user equipment not to migrate from the first network to the second network.

The information about whether the user equipment is allowed to access the access point includes a migration permission indication list of the second network and a second network load list.

The migration permission indication list of the second network is used for representing whether the second network allows the user equipment to migrate from the first network to the second network. Generally, when load of the second network approximates to a rated load value, or a current service type of the user equipment is not suitable for communication performed by using the second network, or the preference information inclines to the first network, the network identifier of the second network is to be included in the migration permission indication list of the second network. Therefore, the base station may instruct, according to the migration permission indication list of the second network, the user equipment that does not learn about a current connection permission status of the second network to disable the receiver of the second network, that is, instruct the user equipment not to migrate from the first network to the second network.

The second network load list is a list that is used for representing a load status of the second network, and is used for determining, by the user equipment by comparing entries in the load list, whether to disable the receiver of the second network.

Further, the base station of the first network may send the information to the user equipment by using any type of the following message:

a system message;

a paging message; or a dedicated message.

The base station may send the information on different paging occasions in the paging message, so that some terminals receive the paging message. A paging occasion is a time (for example, 1 ms) at which the information is sent, and multiple paging occasions are included in one time frame (for example, 10 ms). The time frame appears periodically, and therefore there are multiple paging occasions in one time frame. Which paging occasion of which time frame used by the user equipment for acquiring the information has been specifically described in the prior art, and details are not described herein again. Alternatively, the base station may notify all user equipments within coverage of the base station in a form of broadcast by using a system message, thereby achieving an effect of instructing all the user equipments. Alternatively, the base station may send the information to the user equipment by using a dedicated message that includes a particular identifier of a user equipment, thereby achieving an effect of instructing a particular user equipment.

According to the migration method provided in this embodiment of the present invention, a base station determines a migration occasion on a basis of load information, a service type, or preference information that is obtained, and sends information to a user equipment, where the information includes indication information, information about an access point, a probability value, and an identifier of the user equipment. According to the information, the user equipment in an idle state relative to a first network stops service transmission to a second network, or migrates the service transmission to the first network, where the information further includes load information of the access point and information about whether the user equipment is allowed to access the access point. The user equipment in a non-idle state relative to the first network disables a receiver of the second network according to the information. By using a base station on a network side, the user equipment is instructed to perform network migration, so that according to a load status of the second network, the user equipment is instructed to migrate properly. Further, the second network is enabled to support normal communication of the user equipment.

Figure 3:
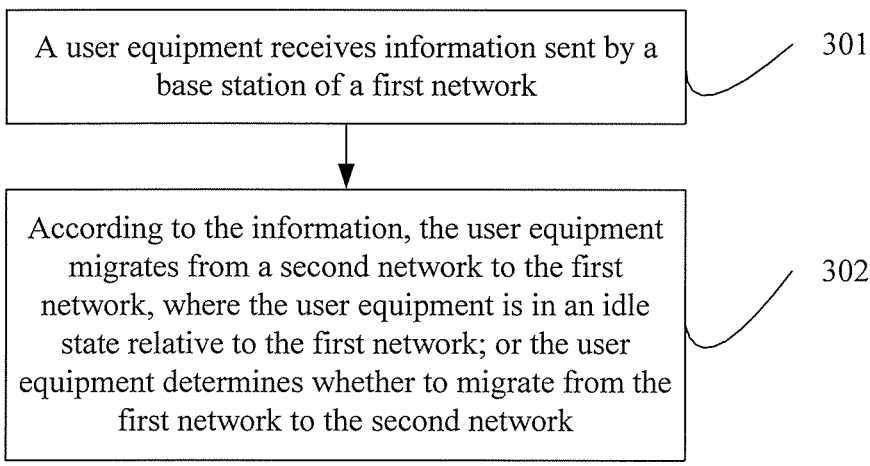
FIG. 3 is still another flowchart of a migration method according to an embodiment of the present invention.

Another embodiment of the present invention further provides a migration method. As shown in FIG. 3, the method includes:

Step 301: A user equipment receives information sent by a base station of a first network.

The user equipment receives the information sent by the base station, so that the base station on a network side instructs the user equipment to perform network migration.

Step 302: According to the information, the user equipment migrates from a second network to the first network, where the user equipment is in an idle state relative to the first network; or the user equipment determines whether to migrate from the first network to the second network, where the first network is a 3GPP network, and the second network is a non-3GPP network.

The user equipment migrates from the second network to the first network according to the information sent by the base station, which can reduce load of the second network, and further ensures that the second network can support normal communication of the user equipment. In addition, the user equipment does not migrate from the first network to the second network according to the information sent by the base station, which can prevent a user equipment from still migrating to the second network when the second network is overloaded, and further ensures the normal communication of the user equipment.

Optionally, that a user equipment receives information sent by a base station of a first network specifically includes that:

the user equipment receives indication information sent by the base station; and that the user equipment migrates from a second network to the first network according to the information specifically includes that:

according to the indication information, the user equipment stops service transmission to the second network, or migrates the service transmission to the first network.

When the user equipment is in the idle state relative to the base station of the first network, after receiving the indication information, the user equipment directly migrates from the second network to the first network according to the indication information, that is, stops the service transmission to the second network, or migrates the service transmission to the first network.

Optionally, that a user equipment receives information sent by a base station specifically includes that:

the user equipment receives information that is about an access point of the second network and sent by the base station; and that the user equipment migrates from a second network to the first network according to the information specifically includes that:

according to the information about the access point, the user equipment stops service transmission to the access point, or migrates the service transmission to the first network.

The information about the access point is included in an access point information list. For the user equipment in the idle state relative to the base station of the first network, after receiving the access point information list sent by the base station, the user equipment compares a network identifier of the second network to which the user equipment connects, with a network identifier in the access point information list. If a network identifier that is the same as the network identifier of the second network to which the user equipment connects exists in the access point information list, the user equipment stops the service transmission to the access point, or migrates the service transmission to the first network.

For example, the access point information list includes three network identifiers "wlan1", "wlan2", and "wlan3", and the network identifier of the second network to which the user equipment connects is "wlan2". After receiving the access point information list, the user equipment compares the network identifier "wlan2" of the second network to which the user equipment connects, with each network identifier in the access point information list. When comparing "wlan2" in the access point information list, the user equipment determines that the network identifier "wlan2" of the second network to which the user equipment connects is the same as a network identifier "wlan2" in the access point information list. In this case, the user equipment stops the service transmission to the access point, or migrates the service transmission to the first network, that is, the user equipment migrates from the second network to the first network.

Optionally, that a user equipment receives information sent by a base station specifically includes that:

the user equipment receives a probability value sent by the base station; and that the user equipment migrates from a second network to the first network according to the information specifically includes that:

according to the probability value and a random number run by the user equipment, the user equipment stops service transmission to the second network, or migrates the service transmission to the first network.

The user equipment obtains a random number by running a function, and compares the random number with the probability value. If the probability value is less or greater than the randomly allocated random number, the user equipment stops the service transmission to the second network, or migrates the service transmission to the first network, that is, the user equipment migrates from the second network to the first network. Because the random number is allocated randomly, there is a specific probability that the random number is less than the probability value. For example, a random number ranging from 0 to 1 is run when the probability value is 0.1, and a probability that the random number is less than 0.1 is 10%. In this case, 10% of user equipments in the second network migrate to the first network.

In addition, the user equipment may further receive the probability value and the information about the access point that are sent by the base station. If the information about the access point is "wlan2" and the probability value is "0.5", the user equipment compares, by running a random number ranging from 0 to 1, the random number with the probability value. When a comparison result is that the random number is less than the probability value, the user equipment determines whether the network identifier of the second network to which the user equipment connects is "wlan2". If yes, the user equipment stops the service transmission to the second network, or migrates the service transmission to the first network, that is, the user equipment migrates from the second network to the first network. Otherwise, the user equipment keeps a current connection status.

Optionally, that the user equipment receives the information sent by the base station specifically includes that:

the user equipment receives an identifier that is of the user equipment and sent by the base station; and that the user equipment migrates from a second network to the first network according to the information specifically includes that:

according to the identifier, the user equipment stops service transmission to the second network, or migrates the service transmission to the first network.

The identifier of the user equipment is included in a user equipment identifier list. After receiving the identifier of the user equipment, the user equipment compares its own equipment identifier with each user equipment identifier in the user equipment identifier list. If they are equal, the user equipment stops the service transmission to the second network, or migrates the service transmission to the first network, that is, migrates from the second network to the first network.

For example, the user equipment identifier list includes the following entries: "UE1", "UE2", and "UE3"; an equipment identifier of the user equipment is "UE3". When the user equipment compares its own equipment identifier ("UE3") with each user equipment identifier in the user equipment identifier list, and finds that "UE3" in the user equipment identifier list is the same as its own equipment identifier ("UE3"), the user equipment stops the service transmission to the second network, or migrates the service transmission to the first network.

In addition, the user equipment may further receive the identifier of the user equipment and the information about the access point that are sent by the base station. If the information about the access point is "wlan2" and the identifier of the user equipment is "UE2", the user equipment compares its own equipment identifier with the received user equipment identifier "UE2". If a comparison result is that the equipment identifier of the user equipment is the same as the received user equipment identifier "UE2", the user equipment determines whether the network identifier of the second network to which the user equipment connects is "wlan2". If yes, the user equipment stops the service transmission to the second network, or migrates the service transmission to the first network, that is, the user equipment migrates from the second network to the first network. Otherwise, the user equipment keeps a current connection status.

Optionally, that the user equipment receives the information sent by the base station specifically includes that:

the user equipment receives access information sent by the base station, where the access information is at least one of the following:

load information of the access point; and information about whether the user equipment is allowed to access the access point; and that the user equipment determines, according to the information, whether to migrate from the first network to the second network specifically includes that:

the user equipment determines, according to the access information, whether to migrate from the first network to the second network.

If the access information is the load information, the load information is included in an overload indication list. After receiving an overload indication list of the second network sent by the base station, the user equipment compares the network identifier of the second network to which the user equipment is to migrate with each network identifier in the overload indication list of the second network. If they are the same, the user equipment determines not to migrate from the first network to the second network. In this manner, before the user equipment migrates from the first network to the second network, an occasion on which the user equipment migrates to the second network is controlled by determining whether a network identifier of the second network to which the user equipment is to migrate exists in the overload indication list of the second network, which avoids a problem that normal communication of the user equipment cannot be supported because a user equipment still migrates to the second network when the second network is overloaded.

The information about whether the user equipment is allowed to access the access point includes a migration permission indication list of the second network.

The migration permission indication list of the second network is shown in Table 1, and the migration permission indication list of the second network is used for representing whether the user equipment is allowed to migrate to the second network.

TABLE 1

| Network identifier | Migration permission status |
|---|---|
| "wlan1" | "yes" |
| "wlan2" | "no" |
| ... | ... |

If the network identifier ("wlan2") of the second network to which the user equipment is to migrate exists in the migration permission indication list of the second network, and it is learned, by querying, that a migration permission status of "wlan2" is "no", the user equipment does not migrate from the first network to the second network. Otherwise, the user equipment may migrate from the first network to the second network whose migration permission status is "yes". In this manner, the user equipment may be enabled to determine, according to a migration permission status of the second network, whether to migrate from the first network to the second network. The user equipment migrates to the second network whose migration permission status is "yes", which can further optimize resource configuration and improve a utilization rate of an idle second network.

The access information may also be a migration prohibited list, and as shown in Table 2, the migration prohibited list is used for representing the second network to which the user equipment is not allowed to migrate.

TABLE 2

| Network identifier |
|---|
| "wlan1" |
| "wlan2" |
| ... |

If the network identifier ("wlan2") of the second network to which the user equipment is to migrate exists in a migration prohibited list of the second network, the user equipment does not migrate from the first network to the second network ("wlan2"). Otherwise, if the network identifier ("wlan3") of the second network to which the user equipment is to migrate does not exist in the migration prohibited list of the second network, the user equipment migrates from the first network to the second network ("wlan3"). In this manner, the user equipment may be enabled to determine, according to a migration permission status of the second network, whether to migrate from the first network to the second network. The user equipment migrates to the second network that does not exist in the migration prohibited list, which can further optimize resource configuration and improve a utilization rate of an idle second network.

The access information may also be a migration allowed list, and as shown in Table 3, the migration allowed list is used for specifically representing those second networks to which the user equipment is allowed to migrate.

TABLE 3

| Network identifier |
|---|
| "wlan1" |
| "wlan2" |
| ... |

If the network identifier ("wlan2") of the second network to which the user equipment is to migrate exists in a migration allowed list of the second network, the user equipment migrates from the first network to the second network ("wlan2"). Otherwise, if the network identifier ("wlan3") of the second network to which the user equipment is to migrate does not exist in the migration allowed list of the second network, the user equipment does not migrate from the first network to the second network ("wlan3"). In this manner, the user equipment may be enabled to determine, according to a migration permission status of the second network, whether to migrate from the first network to the second network. The user equipment migrates to the second network that exists in the migration allowed list, which can further optimize resource configuration and improve a utilization rate of an idle second network.

The information about whether the user equipment is allowed to access the access point further includes a second network load list.

The second network load list is shown in Table 4, where an identifier of the second network is used for representing the second network, a load is used for representing load of the second network, and preset load is used for representing rated load of the second network.

TABLE 4

| Network identifier | Load | Preset load |
|---|---|---|
| "wlan3" | "100" | "90" |
| "wlan4" | "50" | "120" |
| ... | ... | ... |

A user equipment in the first network determines, by comparing the load with the preset load in the second network load list, whether to migrate from the first network to the second network. If the network identifier of the second network to which the user equipment is to migrate is "wlan3", and a load and preset load corresponding to the network identifier "wlan3" are 100 and 90, respectively, the user equipment determines, by comparison, not to shift from the first network to the second network whose network identifier is "wlan3".

Optionally, the user equipment searches the second network load list for an entry in which a load is less than preset load, and acquires a network identifier in the entry. For example, for a second network whose network identifier is "wlan4", its load is less than its preset load, and the user equipment migrates from the first network to the second network whose network identifier is "wlan4". In this manner, the user equipment may be enabled to determine, according to a load status of the second network, whether to migrate from the first network to the second network. The user equipment determines, according to a load and preset load, whether to migrate from the first network to a second network, thereby further optimizing resource configuration and improving a utilization rate of an idle second network.

According to the migration method provided in this embodiment of the present invention, a base station sends information to a user equipment when determining that a load status of a second network exceeds rated load. The user equipment that connects to the second network migrates from the second network to a first network according to the information sent by the base station, which can reduce the load of the second network and enables the second network to support normal communication of the user equipment. The user equipment that connects to the first network does not migrate from the first network to the second network according to access information sent by the base station, which can prevent a user equipment from still migrating to the second network when the second network is overloaded. In addition, the user equipment may not migrate from the first network to the second network according to the access information, and further, the user equipment may determine, according to the access information, a specific second network to which the user equipment is to migrate.

Figure 4:
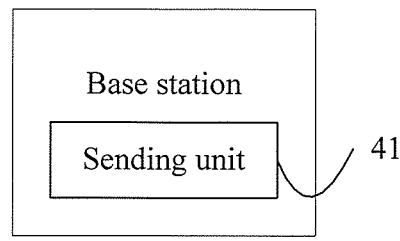
FIG. 4 is a first schematic structural diagram of a base station according to an embodiment of the present invention.

Still another embodiment of the present invention provides a base station. As shown in FIG. 4, the base station is located in a first network, and the base station includes:

a sending unit 41, configured to send information to a user equipment, where the information is used for:

migrating, by the user equipment, from a second network to the first network, where the user equipment is in an idle state relative to the first network; or determining, by the user equipment, whether to migrate from the first network to the second network, where the first network is a 3GPP network, and the second network is a non-3GPP network.

The information sent by the sending unit 41 to the user equipment is used for two purposes: one is to instruct the user equipment to migrate from the second network to the first network, where the user equipment is in the idle state relative to the base station of the first network; the other is to instruct the user equipment not to migrate to the second network, where the user equipment is in a non-idle state relative to the base station of the first network. Migrating from the second network to the first network is specifically: stopping a service of the user equipment on the second network, or disconnecting, by the user equipment, its connection to the second network. Skipping migrating to the second network is specifically: disabling a receiver of the second network.

Optionally, the sending unit 41 is specifically configured to send, to the user equipment, indication information used for instructing the user equipment to stop service transmission to the second network, or for instructing the user equipment to migrate the service transmission to the first network.

The indication information is sent to the user equipment by using the sending unit 41, which may enable the user equipment that receives the indication information to stop the service transmission to the second network, or enable the user equipment to migrate the service transmission to the first network.

Optionally, the sending unit 41 is specifically configured to send, to the user equipment, information about an access point of the second network, which is used by the user equipment, according to the information about the access point, for stopping service transmission to the access point, or migrating the service transmission to the first network.

The information about the access point is specifically an access point information list. For example, the access point information list includes a network identifier "wlan1". After the sending unit 41 sends the access point information list to the user equipment, the user equipment that connects to a WLAN whose network identifier is "wlan1" stops the service transmission to the access point, or migrates the service transmission to the first network. In this manner, for a different second network, the sending unit 41 may instruct the user equipment to stop the service transmission to the access point or migrate the service transmission to the first network.

Optionally, the sending unit 41 is specifically configured to send the user equipment a probability value, which is used by the user equipment, according to the probability value and a random number run by the user equipment, for stopping service transmission to the second network, or migrating the service transmission to the first network.

The probability value is a preset numerical value, such as a numerical value ranging from 0 to 1 or from 1 to 100. Because a random number is allocated randomly, there is a specific probability that the random number is less than the probability value. For example, when the probability value is 0.1, if the user equipment evenly runs a random number ranging from 0 to 1, a probability that an obtained random number is less than 0.1 is 10%. In this case, if the user equipment is in the idle state relative to the base station of the first network, that is, the user equipment connects to the second network, 10% of user equipments that connect to the second network stop the service transmission to the second network, or migrate the service transmission to the first network. In this manner, the sending unit 41 may instruct a specific proportion of the user equipments that connect to the second network to stop the service transmission to the second network, or migrate the service transmission to the first network.

The sending unit 41 may also send both the probability value and the information about the access point to the user equipment. If the information about the access point is "wlan2" and the probability value is "0.5", 50% of user equipments that connect to a second network whose network identifier is "wlan2" stop the service transmission to the second network, or migrate the service transmission to the first network.

Optionally, the sending unit 41 is specifically configured to send the user equipment an identifier of the user equipment, which is used by the user equipment, according to the identifier, for stopping service transmission to the second network, or migrating the service transmission to the first network.

The identifier of the user equipment is included in a user equipment identifier list. The sending unit 41 sends the user equipment the user equipment identifier list, which is used by the user equipment, according to the user equipment identifier list, for stopping the service transmission to the second network, or migrating the service transmission to the first network.

Figure 5:
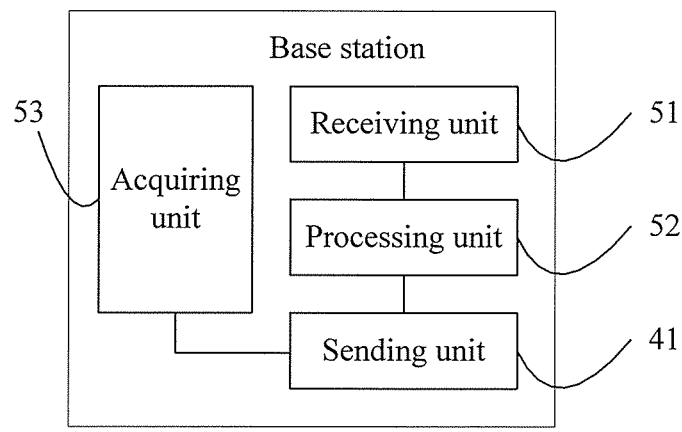
FIG. 5 is a second schematic structural diagram of a base station according to an embodiment of the present invention.

To enable the base station to obtain the user equipment identifier list, as shown in FIG. 5, the base station further includes:

a receiving unit 51, configured to receive a Media Access Control address that is of the user equipment and sent by the access point of the second network; and a processing unit 52, configured to acquire the identifier of the user equipment according to the Media Access Control address of the user equipment.

To enable the base station to obtain the user equipment identifier list of the user equipment, the receiving unit 51 receives an address list sent by the access point, where the address list includes the Media Access Control address of the user equipment; the processing unit 52 acquires a user equipment identifier of the user equipment according to the Media Access Control address received by the receiving unit 51, and adds the acquired user equipment identifier to the user equipment identifier list.

The access point sends, to the base station, the address list that includes the Media Access Control address of the user equipment that connects to the second network. After the receiving unit 51 receives the address list from the access point, the sending unit 41 queries, by using a controller, a core network for an S-TMSI corresponding to the Media Access Control address in the address list. After the receiving unit 51 receives an S-TMSI that is of the user equipment and fed back by the core network, the processing unit 52 maps the S-TMSI into a user equipment identifier and adds the user equipment identifier to the user equipment identifier list. In this manner, a user equipment identifier is converted from a Media Access Control address into an easy-to-identify equipment identifier by mapping, and readability of the user equipment identifier is improved.

Further, the base station further includes:
an acquiring unit 53, configured to acquire:
load information of the access point; or
a service type of the user equipment; or
preference information of the user equipment, where the preference information includes an identifier of a first choice network to be accessed by the user equipment when both the first network and the second network can support normal communication of the user equipment.

To enable the base station of the first network to obtain a network load status of the second network, the acquiring unit 53 of the first network may acquire load information of the second network from the access point. The load information is used for representing a load status of the second network, for example, a load in the second network. If the load information is "100" and rated load information of the second network is "90", the sending unit 41 instructs, according to the load information, the user equipment to stop the service transmission to the second network or migrate the service transmission to the first network.

The acquiring unit 53 may further acquire, from the user equipment, a type of a service that the user equipment currently runs, and the sending unit 41 sends the information to the user equipment according to the service type that is of the user equipment and acquired by the acquiring unit 53. For example, if the user equipment is in the idle state relative to the base station, and the service type acquired by the acquiring unit 53 is a voice call, it is determined that the voice call can be better performed if the user equipment connects to the first network, and the sending unit 41 sends the user equipment the information, which is used for instructing the user equipment to stop the service transmission to the second network or migrate the service transmission to the first network.

The acquiring unit 53 may further acquire the preference information from the user equipment, where the preference information includes the identifier of the first choice network to be accessed by the user equipment when both the first network and the second network can support the normal communication of the user equipment. For example, if the preference information is "the first network" and the user equipment is in the idle state relative to the base station of the first network, the sending unit 41 sends the user equipment the information, which is used for instructing the user equipment to stop the service transmission to the second network or migrate the service transmission to the first network.

Optionally, the sending unit 41 is specifically configured to send access information of the access point to the user equipment, so that the user equipment determines, according to the access information, whether to migrate from the first network to the second network, where the access information is at least one of the following:
load information of the access point; and
information about whether the user equipment is allowed to access the access point.

The load information is included in an overload indication list of the second network; the overload indication list of the second network includes an identifier of a second network, where the identifier of the second network is a network identifier of a second network that is overloaded. The sending unit 41 instructs, according to the overload indication list of the second network, the user equipment that connects to the first network to disable the receiver of the second network, that is, instructs the user equipment not to migrate from the first network to the second network.

The information about whether the user equipment is allowed to access the access point includes a migration permission indication list of the second network and a second network load list.

The migration permission indication list of the second network is used for representing whether the second network allows the user equipment to migrate from the first network to the second network. Generally, when load of the second network approximates to a rated load value, or a current service type of the user equipment is not suitable for communication performed by using the second network, or the preference information inclines to the first network, the network identifier of the second network is to be included in the migration permission indication list of the second network. Therefore, the sending unit 41 may instruct, according to the in-migration permission indication list of the second network, the user equipment that does not learn about a current connection permission status of the second network to disable the receiver of the second network, that is, instruct the user equipment not to migrate from the first network to the second network.

The second network load list is a list that is used for representing a load status of the second network, and is used for determining, by the user equipment by comparing entries in the load list, whether to disable the receiver of the second network.

Further, the sending unit 41 is specifically configured to send the information to the user equipment by using any type of the following message:
a system message;
a paging message; or
a dedicated message.

The sending unit 41 may send the information on different paging occasions in the paging message, so that some of terminals receive the paging message. A paging occasion is a time (for example, 1 ms) at which the information is sent, and multiple paging occasions are included in one time frame (for example, 10 ms). The time frame appears periodically, and therefore there are multiple paging occasions in one time frame. That the user equipment acquires data according to a time frame has been described in the prior art, and details are not described herein again. Alternatively, the sending unit 41 may notify all user equipments within coverage of the base station in a form of broadcast by using a system message, thereby achieving an effect of instructing all the user equipments. Alternatively, the sending unit 41 may send the information to the user equipment by using a dedicated message that includes a particular identifier of a user equipment, thereby achieving an effect of instructing a particular user equipment.

The base station provided in this embodiment of the present invention may perform an action of a base station in the foregoing method embodiment. An acquiring unit 53 determines a migration occasion on a basis of load information, a service type, or preference information that is obtained; information is sent to a user equipment by using a sending unit 41, where the information includes indication information, information about an access point, a probability value, and an identifier of the user equipment. According to the information, the user equipment in an idle state relative to a first network stops service transmission to a second network, or migrates the service transmission to the first network, where the information further includes load information of the access point and information about whether the user equipment is allowed to access the access point. The user equipment in a non-idle state relative to the first network disables a receiver of the second network according to the information. By using the sending unit 41 of a base station on a network side, the user equipment is instructed to perform network migration, so that according to a load status of the second network, the user equipment is instructed to migrate properly. Further, the second network is enabled to support normal communication of the user equipment.

Figure 6:
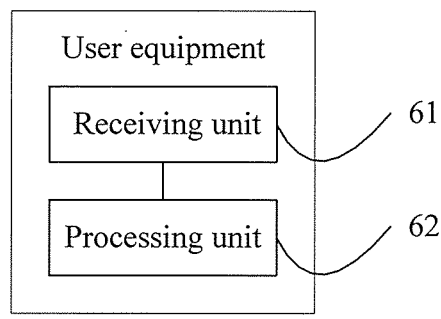
FIG. 6 is a first schematic structural diagram of a user equipment according to an embodiment of the present invention.

Still another embodiment of the present invention further provides a user equipment. As shown in FIG. 6, the user equipment includes:

a receiving unit 61, configured to receive information sent by a base station of a first network, where the receiving unit 61 receives the information sent by the base station, so that the base station on a network side instructs the user equipment to perform network migration; and a processing unit 62, configured to, according to the information received by the receiving unit 61, migrate from a second network to the first network, where the user equipment is in an idle state relative to the first network; or determine whether to migrate from the first network to the second network, where the first network is a 3GPP network, and the second network is a non-3GPP network.

The processing unit 62 migrates from the second network to the first network according to the information received by the receiving unit 61, which can reduce load of the second network, and further ensures that the second network can support normal communication of the user equipment. In addition, the processing unit 62 does not migrate from the first network to the second network according to the information sent by the base station, which can prevent a user equipment from still migrating to the second network when the second network is overloaded, and further ensures the normal communication of the user equipment.

Optionally, the receiving unit 61 is specifically configured to receive indication information sent by the base station; and the processing unit 62 is specifically configured to, according to the indication information, stop service transmission to the second network, or migrate the service transmission to the first network.

When the user equipment is in the idle state relative to the base station of the first network, after the receiving unit 61 receives the indication information, the processing unit 62 directly migrates from the second network to the first network according to the indication information, that is, stops the service transmission to the second network, or migrates the service transmission to the first network.

Optionally, the receiving unit 61 is specifically configured to receive information that is about an access point of the second network and sent by the base station; and the processing unit 62 is specifically configured to, according to the information about the access point, stop service transmission to the access point, or migrate the service transmission to the first network.

The information about the access point is included in an access point information list. For the user equipment in the idle state relative to the base station of the first network, after the receiving unit 61 receives the access point information list sent by the base station, the processing unit 62 compares a network identifier of the second network to which the processing unit 62 connects, with a network identifier in the access point information list. If a network identifier that is the same as the network identifier of the second network to which the processing unit 62 connects exists in the access point information list, the processing unit 62 stops the service transmission to the access point, or migrates the service transmission to the first network.

For example, the access point information list includes three network identifiers "wlan1", "wlan2", and "wlan3", and the network identifier of the second network to which the user equipment connects is "wlan2". After the receiving unit 61 receives the access point information list, the processing unit 62 compares the network identifier "wlan2" of the second network to which the processing unit 62 connects, with each network identifier in the access point information list. When comparing "wlan2" in the access point information list, the processing unit 62 determines that the network identifier "wlan2" of the second network to which the processing unit 62 connects is the same as a network identifier "wlan2" in the access point information list. In this case, the processing unit 62 stops the service transmission to the access point, or migrates the service transmission to the first network, that is, the user equipment migrates from the second network to the first network.

Optionally, the receiving unit 61 is specifically configured to receive a probability value sent by the base station; and the processing unit 62 is specifically configured to, according to the probability value and a random number run by the user equipment, stop the service transmission to the second network, or migrate the service transmission to the first network.

The processing unit 62 obtains a random number by running a function, and compares the random number with the probability value received by the receiving unit 61. If the probability value is less or greater than the randomly allocated random number, the processing unit 62 stops the service transmission to the second network, or migrates the service transmission to the first network, that is, the user equipment migrates from the second network to the first network. Because the random number is allocated randomly, there is a specific probability that the random number is less than the probability value. For example, a random number ranging from 0 to 1 is run when the probability value is 0.1, and a probability that the random number is less than 0.1 is 10%. In this case, 10% of user equipments in the second network migrate to the first network.

In addition, the receiving unit 61 may further receive the probability value and the information about the access point that are sent by the base station. If the information about the access point is "wlan2" and the probability value is "0.5", the processing unit 62 compares, by running a random number ranging from 0 to 1, the random number with the probability value. When a comparison result is that the random number is less than the probability value, the user equipment determines whether the network identifier of the second network to which the user equipment connects is "wlan2". If yes, the processing unit 62 stops the service transmission to the second network, or migrates the service transmission to the first network, that is, the user equipment migrates from the second network to the first network. Otherwise, the user equipment keeps a current connection status.

Optionally, the receiving unit 61 is specifically configured to receive an identifier that is of the user equipment and sent by the base station; and the processing unit 62 is specifically configured to, according to the identifier, stop service transmission to the second network, or migrate the service transmission to the first network.

The identifier of the user equipment is included in a user equipment identifier list. After the receiving unit 61 receives the identifier of the user equipment, the processing unit 62 compares its own equipment identifier with each user equipment identifier in the user equipment identifier list. If they are equal, the processing unit 62 stops the service transmission to the second network, or migrates the service transmission to the first network, that is, migrates from the second network to the first network.

For example, the user equipment identifier list includes the following entries: "UE1", "UE2", and "UE3"; an equipment identifier of the user equipment is "UE3". When the processing unit 62 compares its own equipment identifier ("UE3") with each user equipment identifier in the user equipment identifier list, and finds that "UE3" in the user equipment identifier list is the same as its own equipment identifier ("UE3"), the processing unit 62 stops the service transmission to the second network, or migrates the service transmission to the first network.

In addition, the receiving unit 61 may further receive the identifier of the user equipment and the information about the access point that are sent by the base station. If the information about the access point is "wlan2" and the identifier of the user equipment is "UE2", the processing unit 62 compares its own equipment identifier with the received user equipment identifier "UE2". If a comparison result is that the equipment identifier of the user equipment is the same as the received user equipment identifier "UE2", the processing unit 62 determines whether the network identifier of the second network to which the processing unit 62 connects is "wlan2". If yes, the processing unit 62 stops the service transmission to the second network, or migrates the service transmission to the first network, that is, the user equipment migrates from the second network to the first network. Otherwise, the processing unit 62 keeps a current connection status.

Optionally, the receiving unit 61 is specifically configured to receive access information sent by the base station, where the access information is at least one of the following:

load information of an access point; and information about whether the user equipment is allowed to access the access point; and the processing unit 62 is specifically configured to determine, according to the access information, whether to migrate from the first network to the second network.

If the access information is the load information, the load information is included in an overload indication list. After the receiving unit 61 receives an overload indication list of the second network sent by the base station, the processing unit 62 compares the network identifier of the second network to which the user equipment is to migrate with each network identifier in the overload indication list of the second network. If they are the same, the processing unit 62 determines not to migrate from the first network to the second network. In this manner, before the processing unit 62 migrates from the first network to the second network, an occasion on which the user equipment migrates to the second network is instructed by determining whether a network identifier of the second network to which the user equipment is to migrate exists in the overload indication list of the second network, which avoids a problem that normal communication of the user equipment cannot be supported because a user equipment still migrates to the second network when the second network is overloaded.

The information about whether the user equipment is allowed to access the access point includes a migration permission indication list of the second network.

The migration permission indication list of the second network is shown in Table 1, and the migration permission indication list of the second network is used for representing whether the user equipment is allowed to migrate to the second network.

If the network identifier ("wlan2") of the second network to which the user equipment is to migrate exists in the migration permission indication list of the second network, and the processing unit 62 learns, by querying, that a migration permission status of "wlan2" is "no", the processing unit 62 does not migrate from the first network to the second network. Otherwise, the processing unit 62 may migrate from the first network to the second network whose migration permission status is "yes". In this manner, the processing unit 62 may be enabled to determine, according to a migration permission status of the second network, whether to migrate from the first network to the second network. The user equipment migrates to the second network whose migration permission status is "yes", which can further optimize resource configuration and improve a utilization rate of an idle second network.

The access information may also be a migration prohibited list, and as shown in Table 2, the migration prohibited list is used for representing the second network to which the user equipment is not allowed to migrate.

If the network identifier ("wlan2") of the second network to which the user equipment is to migrate exists in a migration prohibited list of the second network, the processing unit 62 does not migrate from the first network to the second network ("wlan2"). Otherwise, if the network identifier ("wlan3") of the second network to which the user equipment is to migrate does not exist in the migration prohibited list of the second network, the processing unit 62 migrates from the first network to the second network ("wlan3"). In this manner, the processing unit 62 may be enabled to determine, according to a migration permission status of the second network, whether to migrate from the first network to the second network. The processing unit 62 migrates to the second network that does not exist in the migration prohibited list, which can further optimize resource configuration and improve a utilization rate of an idle second network.

The access information may also be a migration allowed list, and as shown in Table 3, the migration allowed list is used for specifically representing those second networks to which the user equipment is allowed to migrate.

If the network identifier ("wlan2") of the second network to which the user equipment is to migrate exists in a migration allowed list of the second network, the processing unit 62 migrates from the first network to the second network ("wlan2"). Otherwise, if the network identifier ("wlan3") of the second network to which the user equipment is to migrate does not exist in the migration prohibited list of the second network, the processing unit 62 does not migrate from the first network to the second network ("wlan3"). In this manner, the processing unit 62 may be enabled to determine, according to a migration permission status of the second network, whether to migrate from the first network to the second network. The user equipment migrates to the second network that exists in the migration allowed list, which can further optimize resource configuration and improve a utilization rate of an idle second network.

The information about whether the user equipment is allowed to access the access point further includes a second network load list.

The second network load list is shown in Table 4, where an identifier of the second network is used for representing the second network, a load is used for representing load of the second network, and preset load is used for representing rated load of the second network.

The processing unit 62 determines, by comparing the load with the preset load in the second network load list, whether to migrate from the first network to the second network. If the network identifier of the second network to which the user equipment is to migrate is "wlan3", and a load and preset load corresponding to the network identifier "wlan3" are 100 and 90, respectively, the processing unit 62 determines, by comparison, not to shift from the first network to the second network whose network identifier is "wlan3".

Optionally, the processing unit 62 searches the second network load list for an entry in which a load is less than preset load, and acquires a network identifier in the entry. For example, for a second network whose network identifier is "wlan4", its load is less than its preset load, and the processing unit 62 migrates from the first network to the second network whose network identifier is "wlan4". In this manner, the processing unit 62 may be enabled to determine, according to a load status of the second network, whether to migrate from the first network to the second network. The user equipment determines, according to a load and preset load, whether to migrate from the first network to a second network, thereby further optimizing resource configuration and improving a utilization rate of an idle second network.

Figure 7:
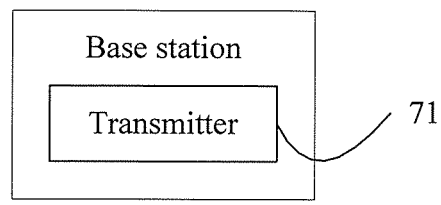
FIG. 7 is a third schematic structural diagram of a base station according to an embodiment of the present invention.

Still another embodiment of the present invention provides a base station. As shown in FIG. 7, the base station is located in a first network, and the base station includes:

a transmitter 71, configured to send information to a user equipment, where the information is used for:

migrating, by the user equipment, from a second network to the first network, where the user equipment is in an idle state relative to the first network; or determining, by the user equipment, whether to migrate from the first network to the second network, where the first network is a 3GPP network, and the second network is a non-3GPP network.

The information sent by the transmitter 71 to the user equipment is used for two purposes: one is to instruct the user equipment to migrate from the second network to the first network, where the user equipment is in the idle state relative to the base station of the first network; the other is to instruct the user equipment not to migrate to the second network, where the user equipment is in a non-idle state relative to the base station of the first network. Migrating from the second network to the first network is specifically: stopping a service of the user equipment on the second network, or disconnecting, by the user equipment, its connection to the second network. Skipping migrating to the second network is specifically: disabling a receiver 81 of the second network.

Optionally, the transmitter 71 is specifically configured to send, to the user equipment, indication information used for instructing the user equipment to stop service transmission to the second network, or for instructing the user equipment to migrate the service transmission to the first network.

The indication information is sent to the user equipment by using the transmitter 71, which may enable the user equipment that receives the indication information to stop the service transmission to the second network, or enable the user equipment to migrate the service transmission to the first network.

Optionally, the transmitter 71 is specifically configured to send, to the user equipment, information about an access point of the second network, which is used by the user equipment, according to the information about the access point, for stopping service transmission to the access point, or migrating the service transmission to the first network.

The information about the access point is specifically an access point information list. For example, the access point information list includes a network identifier "wlan1". After the transmitter 71 sends the access point information list to the user equipment, the user equipment that connects to a WLAN whose network identifier is "wlan1" stops the service transmission to the access point, or migrates the service transmission to the first network. In this manner, for a different second network, the transmitter 71 may instruct the user equipment to stop the service transmission to the access point or migrate the service transmission to the first network.

Optionally, the transmitter 71 is specifically configured to send the user equipment a probability value, which is used by the user equipment, according to the probability value and a random number run by the user equipment, for stopping service transmission to the second network, or migrating the service transmission to the first network.

The probability value is a preset numerical value, such as a numerical value ranging from 0 to 1 or from 1 to 100. Because a random number is allocated randomly, there is a specific probability that the random number is less than the probability value. For example, when the probability value is 0.1, if the user equipment evenly runs a random number ranging from 0 to 1, a probability that an obtained random number is less than 0.1 is 10%. In this case, if the user equipment is in the idle state relative to the base station of the first network, that is, the user equipment connects to the second network, 10% of user equipments that connect to the second network stop the service transmission to the second network, or migrate the service transmission to the first network. In this manner, the transmitter 71 may instruct a specific proportion of the user equipments that connect to the second network to stop the service transmission to the second network, or migrate the service transmission to the first network.

The transmitter 71 may also send both the probability value and the information about the access point to the user equipment. If the information about the access point is "wlan2" and the probability value is "0.5", 50% of user equipments that connect to a second network whose network identifier is "wlan2" stop the service transmission to the second network, or migrate the service transmission to the first network.

Optionally, the transmitter 71 is specifically configured to send the user equipment an identifier of the user equipment, which is used by the user equipment, according to the identifier, for stopping service transmission to the second network, or migrating the service transmission to the first network.

The identifier of the user equipment is included in a user equipment identifier list. The transmitter 71 sends the user equipment the user equipment identifier list, which is used by the user equipment, according to the user equipment identifier list, for stopping the service transmission to the second network, or migrating the service transmission to the first network.

Figure 8:
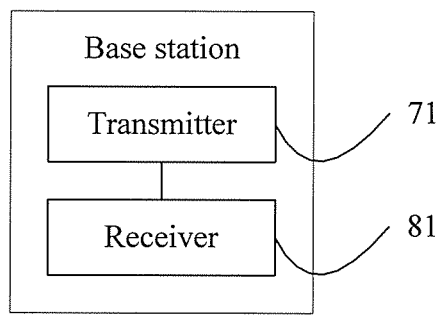
FIG. 8 is a fourth schematic structural diagram of a base station according to an embodiment of the present invention.

To enable the base station to obtain the user equipment identifier list, as shown in FIG. 8, the base station further includes:

the receiver 81, configured to receive a Media Access Control address that is of the user equipment and sent by the access point of the second network, and acquire the identifier of the user equipment according to the Media Access Control address of the user equipment.

To enable the base station to obtain the user equipment identifier list of the user equipment, the receiver 81 receives an address list sent by the access point, where the address list includes the Media Access Control address of the user equipment; the receiver 81 acquires a user equipment identifier of the user equipment according to the received Media Access Control address, and adds the acquired user equipment identifier to the user equipment identifier list.

The access point sends, to the base station, the address list that includes the Media Access Control address of the user equipment that connects to the second network. After the receiver 81 receives the address list from the access point, the transmitter 71 queries, by using a controller, a core network for an S-TMSI corresponding to the Media Access Control address in the address list. After receiving an S-TMSI that is of the user equipment and fed back by the core network, the receiver 81 maps the S-TMSI into a user equipment identifier and adds the user equipment identifier to the user equipment identifier list. In this manner, a user equipment identifier is converted from a Media Access Control address into an easy-to-identify equipment identifier by mapping, and readability of the user equipment identifier is improved.

Further, the receiver 81 is further configured to receive:
load information of the access point; or
a service type of the user equipment; or
preference information of the user equipment, where the preference information includes an identifier of a first choice network to be accessed by the user equipment when both the first network and the second network can support normal communication of the user equipment.

To enable the base station of the first network to obtain a network load status of the second network, the receiver 81 of the first network may acquire load information of the second network from the access point. The load information is used for representing a load status of the second network, for example, a load in the second network. If the load information is "100" and rated load information of the second network is "90", the transmitter 71 instructs, according to the load information, the user equipment to stop the service transmission to the second network or migrate the service transmission to the first network.

The receiver 81 may further acquire, from the user equipment, a type of a service that the user equipment currently runs, and the transmitter 71 sends the information to the user equipment according to the service type that is of the user equipment and acquired by the receiver 81. For example, if the user equipment is in the idle state relative to the base station, and the service type acquired by the receiver 81 is a voice call, in this case, the voice call can be better performed if the user equipment connects to the first network, and the transmitter 71 sends the user equipment the information, which is used for instructing the user equipment to stop the service transmission to the second network or migrate the service transmission to the first network.

The receiver 81 may further acquire the preference information from the user equipment, where the preference information includes the identifier of the first choice network to be accessed by the user equipment when both the first network and the second network can support the normal communication of the user equipment. For example, if the preference information is "the first network" and the user equipment is in the idle state relative to the base station of the first network, the transmitter 71 sends the user equipment the information, which is used for instructing the user equipment to stop the service transmission to the second network or migrate the service transmission to the first network.

Optionally, the transmitter 71 is specifically configured to send access information of the access point to the user equipment, so that the user equipment determines, according to the access information, whether to migrate from the first network to the second network, where the access information is at least one of the following:
load information of the access point; and
information about whether the user equipment is allowed to access the access point.

The load information is included in an overload indication list of the second network; the overload indication list of the second network includes an identifier of a second network, where the identifier of the second network is a network identifier of a second network that is overloaded. The transmitter 71 instructs, according to the overload indication list of the second network, the user equipment that connects to the first network to disable the receiver 81 of the second network, that is, instructs the user equipment not to migrate from the first network to the second network.

The information about whether the user equipment is allowed to access the access point includes a migration permission indication list of the second network and a second network load list.

The migration permission indication list of the second network is used for representing whether the second network allows the user equipment to migrate from the first network to the second network. Generally, when load of the second network approximates to a rated load value, or a current service type of the user equipment is not suitable for communication performed by using the second network, or the preference information inclines to the first network, the network identifier of the second network is to be included in the migration permission indication list of the second network. Therefore, the transmitter 71 may instruct, according to the migration permission indication list of the second network, the user equipment that does not learn about a current connection permission status of the second network to disable the receiver 81 of the second network, that is, instruct the user equipment not to migrate from the first network to the second network.

The second network load list is a list that is used for representing a load status of the second network, and is used for determining, by the user equipment by comparing entries in the load list, whether to disable the receiver 81 of the second network.

Further, the transmitter 71 is specifically configured to send the information to the user equipment by using any type of the following message:

a system message;

a paging message; or a dedicated message.

The transmitter 71 may send the information on different paging occasions in the paging message, so that some terminals receive the paging message. A paging occasion is a time (for example, 1 ms) at which the information is sent, and multiple paging occasions are included in one time frame (for example, 10 ms). The time frame appears periodically, and therefore there are multiple paging occasions in one time frame. That the user equipment acquires data according to a time frame has been described in the prior art, and details are not described herein again. Alternatively, the transmitter 71 may notify all user equipments within coverage of the base station in a form of broadcast by using a system message, thereby achieving an effect of instructing all the user equipments. Alternatively, the transmitter 71 may send the information to the user equipment by using a dedicated message that includes a particular identifier of a user equipment, thereby achieving an effect of instructing a particular user equipment.

According to the base station provided in this embodiment of the present invention, a receiver 81 determines a migration occasion on a basis of load information, a service type, or preference information that is obtained; information is sent to a user equipment by using a transmitter 71, where the information includes indication information, information about an access point, a probability value, and an identifier of the user equipment. According to the information, the user equipment in an idle state relative to a first network stops service transmission to a second network, or migrates the service transmission to the first network, where the information further includes load information of the access point and information about whether the user equipment is allowed to access the access point. The user equipment in a non-idle state relative to the first network disables the receiver 81 of the second network according to the information. By using the transmitter 71 of a base station on a network side, the user equipment is instructed to perform network migration, so that according to a load status of the second network, the user equipment is instructed to migrate properly. Further, the second network is enabled to support normal communication of the user equipment.

Figure 9:
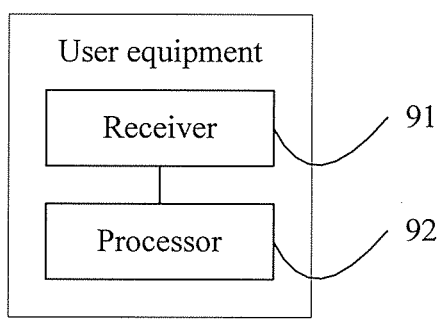
FIG. 9 is a second schematic structural diagram of a user equipment according to an embodiment of the present invention.

Still another embodiment of the present invention provides a user equipment. As shown in FIG. 9, the user equipment includes:

a receiver 91, configured to receive information sent by a base station of a first network, where the receiver 91 receives the information sent by the base station, so that the base station on a network side instructs the user equipment to perform network migration; and a processor 92, configured to, according to the information received by the receiver 91, migrate from a second network to the first network, where the user equipment is in an idle state relative to the first network; or determine whether to migrate from the first network to the second network, where the first network is a 3GPP network, and the second network is a non-3GPP network.

The processor 92 migrates from the second network to the first network according to the information received by the receiver 91, which can reduce load of the second network, and further ensures that the second network can support normal communication of the user equipment. In addition, the processor 92 does not migrate from the first network to the second network according to the information sent by the base station, which can prevent a user equipment from still migrating to the second network when the second network is overloaded, and further ensures the normal communication of the user equipment.

Optionally, the receiver 91 is specifically configured to receive indication information sent by the base station; and the processor 92 is specifically configured to, according to the indication information, stop service transmission to the second network, or migrate the service transmission to the first network.

When the user equipment is in the idle state relative to the base station of the first network, after the receiver 91 receives the indication information, the processor 92 directly migrates from the second network to the first network according to the indication information, that is, stops the service transmission to the second network, or migrates the service transmission to the first network.

Optionally, the receiver 91 is specifically configured to receive information that is about an access point of the second network and sent by the base station; and the processor 92 is specifically configured to, according to the information about the access point, stop service transmission to the access point, or migrate the service transmission to the first network.

The information about the access point is included in an access point information list. For the user equipment in the idle state relative to the base station of the first network, after the receiver 91 receives the access point information list sent by the base station, the processor 92 compares a network identifier of the second network to which the processor 92 connects, with a network identifier in the access point information list. If a network identifier that is the same as the network identifier of the second network to which the processor 92 connects exists in the access point information list, the processor 92 stops the service transmission to the access point, or migrates the service transmission to the first network.

For example, the access point information list includes three network identifiers "wlan1", "wlan2", and "wlan3", and the network identifier of the second network to which the user equipment connects is "wlan2". After the receiver 91 receives the access point information list, the processor 92 compares the network identifier "wlan2" of the second network to which the processor 92 connects, with each network identifier in the access point information list. When comparing "wlan2" in the access point information list, the processor 92 determines that the network identifier "wlan2" of the second network to which the processor 92 connects is the same as a network identifier "wlan2" in the access point information list. In this case, the processor 92 stops the service transmission to the access point, or migrates the service transmission to the first network, that is, the user equipment migrates from the second network to the first network.

Optionally, the receiver 91 is specifically configured to receive a probability value sent by the base station; and the processor 92 is specifically configured to, according to the probability value and a random number run by the user equipment, stop service transmission to the second network, or migrate the service transmission to the first network.

The processor 92 obtains a random number by running a function, and compares the random number with the probability value received by the receiver 91. If the probability value is less or greater than the randomly allocated random number, the processor 92 stops the service transmission to the second network, or migrates the service transmission to the first network, that is, the user equipment migrates from the second network to the first network. Because the random number is allocated randomly, there is a specific probability that the random number is less than the probability value. For example, a random number ranging from 0 to 1 is run when the probability value is 0.1, and a probability that the random number is less than 0.1 is 10%. In this case, 10% of user equipments in the second network migrate to the first network.

In addition, the receiver 91 may further receive the probability value and the information about the access point that are sent by the base station. If the information about the access point is "wlan2" and the probability value is "0.5", the processor 92 compares, by running a random number ranging from 0 to 1, the random number with the probability value. When a comparison result is that the random number is less than the probability value, the user equipment determines whether the network identifier of the second network to which the user equipment connects is "wlan2". If yes, the processor 92 stops the service transmission to the second network, or migrates the service transmission to the first network, that is, the user equipment migrates from the second network to the first network. Otherwise, the user equipment keeps a current connection status.

Optionally, the receiver 91 is specifically configured to receive an identifier that is of the user equipment and sent by the base station; and the processor 92 is specifically configured to, according to the identifier, stop service transmission to the second network, or migrate the service transmission to the first network.

The identifier of the user equipment is included in a user equipment identifier list. After the receiver 91 receives the identifier of the user equipment, the processor 92 compares its own equipment identifier with each user equipment identifier in the user equipment identifier list. If they are equal, the processor 92 stops the service transmission to the second network, or migrates the service transmission to the first network, that is, migrates from the second network to the first network.

For example, the user equipment identifier list includes the following entries: "UE1", "UE2", and "UE3"; an equipment identifier of the user equipment is "UE3". When the processor 92 compares its own equipment identifier ("UE3") with each user equipment identifier in the user equipment identifier list, and finds that "UE3" in the user equipment identifier list is the same as its own equipment identifier ("UE3"), the processor 92 stops the service transmission to the second network, or migrates the service transmission to the first network.

In addition, the receiver 91 may further receive the identifier of the user equipment and the information about the access point that are sent by the base station. If the information about the access point is "wlan2" and the identifier of the user equipment is "UE2", the processor 92 compares its own equipment identifier with the received user equipment identifier "UE2". If a comparison result is that the equipment identifier of the user equipment is the same as the received user equipment identifier "UE2", the processor 92 determines whether the network identifier of the second network to which the processor 92 connects is "wlan2". If yes, the processor 92 stops the service transmission to the second network, or migrates the service transmission to the first network, that is, the user equipment migrates from the second network to the first network. Otherwise, the processor 92 keeps a current connection status.

Optionally, the receiver 91 is specifically configured to receive access information sent by the base station, where the access information is at least one of the following:

load information of an access point; and information about whether the user equipment is allowed to access the access point; and the processor 92 is specifically configured to determine, according to the access information, whether to migrate from the first network to the second network.

If the access information is the load information, the load information is included in an overload indication list. After the receiver 91 receives an overload indication list of the second network sent by the base station, the processor 92 compares the network identifier of the second network to which the user equipment is to migrate with each network identifier in the overload indication list of the second network. If they are the same, the processor 92 determines not to migrate from the first network to the second network. In this manner, before the processor 92 migrates from the first network to the second network, an occasion on which the user equipment migrates to the second network is controlled by determining whether a network identifier of the second network to which the user equipment is to migrate exists in the overload indication list of the second network, which avoids a problem that normal communication of the user equipment cannot be supported because a user equipment still migrates to the second network when the second network is overloaded.

The information about whether the user equipment is allowed to access the access point includes a migration permission indication list of the second network.

The migration permission indication list of the second network is shown in Table 1, and the migration permission indication list of the second network is used for representing whether the user equipment is allowed to migrate to the second network.

If the network identifier ("wlan2") of the second network to which the user equipment is to migrate exists in the migration permission indication list of the second network, and the processor 92 learns, by querying, that a migration permission status of "wlan2" is "no", the processor 92 does not migrate from the first network to the second network. Otherwise, the processor 92 may migrate from the first network to the second network whose migration permission status is "yes". In this manner, the processor 92 may be enabled to determine, according to a migration permission status of the second network, whether to migrate from the first network to the second network. The user equipment migrates to the second network whose migration permission status is "yes", which can further optimize resource configuration and improve a utilization rate of an idle second network.

The access information may also be a migration prohibited list, and as shown in Table 2, the migration prohibited list is used for representing the second network to which the user equipment is not allowed to migrate.

If the network identifier ("wlan2") of the second network to which the user equipment is to migrate exists in a migration prohibited list of the second network, the processor 92 does not migrate from the first network to the second network ("wlan2"). Otherwise, if the network identifier ("wlan3") of the second network to which the user equipment is to migrate does not exist in the migration prohibited list of the second network, the processor 92 migrates from the first network to the second network ("wlan3"). In this manner, the processor 92 may be enabled to determine, according to a migration permission status of the second network, whether to migrate from the first network to the second network. The processor 92 migrates to the second network that does not exist in the migration prohibited list, which can further optimize resource configuration and improve a utilization rate of an idle second network.

The access information may also be a migration allowed list, and as shown in Table 3, the migration allowed list is used for specifically representing those second networks to which the user equipment is allowed to migrate.

If the network identifier ("wlan2") of the second network to which the user equipment is to migrate exists in a migration allowed list of the second network, the processor 92 migrates from the first network to the second network ("wlan2"). Otherwise, if the network identifier ("wlan3") of the second network to which the user equipment is to migrate does not exist in the migration prohibited list of the second network, the processor 92 does not migrate from the first network to the second network ("wlan3"). In this manner, the processor 92 may be enabled to determine, according to a migration permission status of the second network, whether to migrate from the first network to the second network. The user equipment migrates to the second network that exists in the migration allowed list, which can further optimize resource configuration and improve a utilization rate of an idle second network.

The information about whether the user equipment is allowed to access the access point further includes a second network load list.

The second network load list is shown in Table 4, where an identifier of the second network is used for representing the second network, a load is used for representing load of the second network, and preset load is used for representing rated load of the second network.

The processor 92 determines, by comparing the load with the preset load in the second network load list, whether to migrate from the first network to the second network. If the network identifier of the second network to which the user equipment is to migrate is "wlan3", and a load and preset load corresponding to the network identifier "wlan3" are 100 and 90, respectively, the processor 92 determines, by comparison, not to shift from the first network to the second network whose network identifier is "wlan3".

Optionally, the processor 92 searches the second network load list for an entry in which a load is less than preset load, and acquires a network identifier in the entry. For example, for a second network whose network identifier is "wlan4", its load is less than its preset load, and the processor 92 migrates from the first network to the second network whose network identifier is "wlan4". In this manner, the processor 92 may be enabled to determine, according to a load status of the second network, whether to migrate from the first network to the second network. The user equipment determines, according to a load and preset load, whether to migrate from the first network to a second network, thereby further optimizing resource configuration and improving a utilization rate of an idle second network.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A migration method, comprising:
   sending, by a base station of a first network, information to a user equipment, wherein the information is used for:
   migrating, by the user equipment, from a second network to the first network, wherein the user equipment is in an idle state relative to the first network; or
   determining, by the user equipment, whether to migrate from the first network to the second network; and wherein the first network is a 3rd Generation Partnership Project (3GPP) network, and the second network is a non-3GPP network;
wherein the information used for migrating, by the user equipment, from the second network to the first network, or for determining whether to migrate from the first network to the second network, comprises:
information about an access point of the second network, and is used by the user equipment, according to the information about the access point, for migrating service transmission from the second network to the first network, or for determining whether to migrate service transmission from the first network to the second network.

2. The method according to claim 1, wherein sending, by a base station of a first network, information to a user equipment comprises:
sending, by the base station, the information to the user equipment using a system message or a dedicated message.

3. A migration method, comprising:
receiving, by a user equipment, information sent by a base station of a first network;
migrating, by the user equipment, from a second network to the first network, wherein the user equipment is in an idle state relative to the first network; or
determining, by the user equipment, whether to migrate from the first network to the second network; and
wherein the first network is a 3GPP network, and the second network is a non-3GPP network;
wherein receiving, by the user equipment, information sent by the base station comprises:
receiving, by the user equipment, information that is about an access point of the second network and sent by the base station; and
migrating, by the user equipment, from the second network to the first network, or determining whether to migrate from the first network to the second network according to the information comprises:
according to the information about the access point, migrating, by the user equipment, service transmission from the second network to the first network, or determining whether to migrate service transmission from the first network to the second network.

4. A base station, wherein the base station is located in a first network, and the base station comprises:
a transmitter, configured to send information to a user equipment, wherein the information is used for:
migrating, by the user equipment, from a second network to the first network, wherein the user equipment is in an idle state relative to the first network; or
determining, by the user equipment, whether to migrate from the first network to the second network; and
wherein the first network is a 3 GPP network, and the second network is a non-3GPP network;
wherein the transmitter is configured to:
send, to the user equipment, information about an access point of the second network, which is used by the user equipment, according to the information about the access point, for migrating service transmission from the second network to the first network, or for determining whether to migrate service transmission from the first network to the second network.

5. The base station according to claim 4, wherein the transmitter is configured to send the information to the user equipment by using a system message or a dedicated message.

6. A user equipment, comprising:
a receiver, configured to receive information sent by a base station of a first network;
a processor, configured to, according to the information received by the receiver:
migrate from a second network to the first network, wherein the user equipment is in an idle state relative to the first network, or
determine whether to migrate from the first network to the second network; and
wherein the first network is a 3 GPP network, and the second network is a non-3GPP network;
wherein the receiver is configured to receive information about an access point of the second network and sent by the base station; and
the processor is configured to, according to the information about the access point, migrate service transmission from the second network to the first network, or determine whether to migrate service transmission from the first network to the second network.

7. A base station, wherein the base station is located in a first network, and the base station comprises:
a transmitter, configured to send information to a user equipment, wherein the information is used for:
migrating, by the user equipment, from a second network to the first network, wherein the user equipment is in an idle state relative to the first network; or
determining, by the user equipment, whether to migrate from the first network to the second network; and
wherein the first network is a 3GPP network, and the second network is a non-3GPP network;
wherein the transmitter is configured to:
send access information of an access point to the user equipment wherein the user equipment determines, according to the access information, to migrate service transmission from the second network to the first network, or whether to migrate service transmission from the first network to the second network, wherein the access information is load information of the access point.

8. A user equipment, comprising:
a receiver, configured to receive information sent by a base station of a first network;
a processor, configured to, according to the information received by the receiver:
migrate from a second network to the first network, wherein the user equipment is in an idle state relative to the first network, or
determine whether to migrate from the first network to the second network; and
wherein the first network is a 3 GPP network, and the second network is a non-3GPP network;
wherein the receiver is configured to receive access information sent by the base station, wherein the access information is load information of an access point; and
the processor is configured to determine, according to the access information, to migrate service transmission from the second network to the first network, or whether to migrate service information from the first network to the second network.

\* \* \* \* \*